Figures 2, 3:
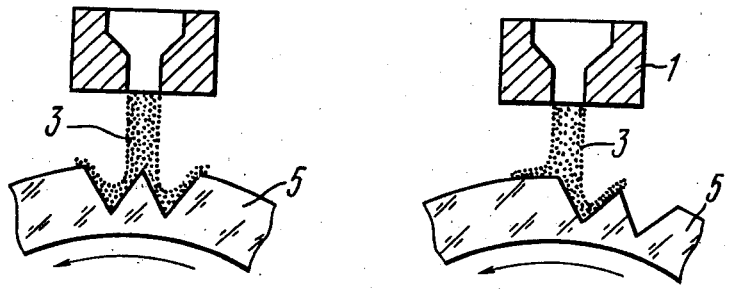

United States Patent [19]

Eremeev et al.

[11] 4,445,922
[45] May 1, 1984

[54] METHOD OF HEAT POLISHING PATTERN CUT GLASSWARE

[75] Inventors: Vadim V. Eremeev; Jury A. Guloian, both of Gus-Khrustalny, U.S.S.R.

[73] Assignee: Gusevsky Fulual Gosudarstvennogo Nauchno-Issledovatelskogo Insitut Stekla, Vladimir, U.S.S.R.

[21] Appl. No.: 351,510

[22] Filed: Feb. 23, 1982

Related U.S. Application Data

[63] Continuation of Ser. No. 223,075, Jan. 7, 1981, abandoned.

[30] Foreign Application Priority Data

Apr. 24, 1979 [SU] U.S.S.R. .............................. 2757714

[51] Int. Cl.³ ............................................. C03B 29/04
[52] U.S. Cl. ..................................................... 65/120
[58] Field of Search .................... 65/120, 284, 65, 104

[56] References Cited

U.S. PATENT DOCUMENTS 2,507,433  5/1950  Borchert et al. ...................... 65/120
2,566,350  9/1951  Meier .................................... 65/120

FOREIGN PATENT DOCUMENTS 113515   4/1965  Czechoslovakia .
129360  10/1968  Czechoslovakia .
1067104  5/1967  United Kingdom .

Primary Examiner—Richard V. Fisher
Attorney, Agent, or Firm—Ladas & Parry

[57] ABSTRACT

A method of heat polishing pattern cut glassware by subjecting the surface thereof to high heat resides in that the heat polishing is carried out by a beam of concentrated heat flow with sequential movement thereof along the entire surface of the glassware being polished, the selectable effective width of the concentrated heat flow being substantially less than the circumference of the ware being polished, each element of the cut pattern being exposed to equal heat stress.

3 Claims, 3 Drawing Figures

METHOD OF HEAT POLISHING PATTERN CUT GLASSWARE

This is a continuation of application Ser. No. 223,075 filed Jan. 7, 1981, now abandoned.

This invention relates to the treatment of glassware, and more particularly to methods of heat polishing the surface of cut patterned glassware obtained by grinding the surface after glass forming or in any combination of the two operations.

The present invention can find application in the glass industry for manufacturing richly ornamented glass tableware predominantly from lead glass, such as tumblers, goblets, flower vases, illuminating glassware, such as wall fittings, luminaires, chandelier components, etc., the surface of which needs to be perfected.

Known in the art are numerous methods of polishing the gray cut surface of ornamental designs in glass articles.

Wide use has been made of a method of chemical polishing glassware using hydrofluoric and sulfuric acids.

The essence of this method resides in the elimination of the surface roughness of cuts by dissolving the surface irregularities.

It is effected by dipping the glassware to be polished into a bath of a mixture of hydrofluoric and sulfuric acids to be followed by washing the ware.

Inherent in this method are a number of disadvantages, among which are the following:

high cost of equipment for carrying out the method;
adverse working conditions for operating personnel; and
unfavorable effect of the chemical process on the environment.

In addition, it is difficult to execise a precise control over the acid polishing of glassware in mass production thereof.

Also known are various methods of heat polishing the surface of glassware.

The essence of heat polishing resides in the application of heat to the surface of a glass article until it is caused to flow and consequent straightening thereof by virtue of the surface tension forces.

Exposure of the article to the heat of such high intensity, however, must not be accompanied by structural deformation thereof. This can be attained by maintaining the temperature in the body of the glassware wall structure essentially below than that at the surface exposed to high heat thanks to low heat conductivity of glass. In heat polishing smooth surfaces, such as those of sheet glass, good operating conditions can be attained relatively easily due to the uniform nature of the surface of sheet glass. Therewith, there are no rigid requirements to be met as regards the shape of the heat flow and precise positioning of the heat flow relative to the glass material being polished.

The problem becomes more complex in the case of glass articles with ornamental design cuts, wherein surface uniformity is broken in various directions. Besides, application of design cuts to a glassware by grinding wheels leaves transparent portions with a glazed surface in combination with translucent gray cuts having a rough surface, the design cuts being characterized by both small and large elements.

The known methods of thermal polishing never allowed for the aforedescribed peculiarities of the cut patterns; they provided a powerful flow of dispersed heat directed against the glassware being polished covering as much of the surface thereof as possible. This produced rather adverse conditions for obtaining a uniformly polishedwithout deformation of the glassware structure or distortion of the design cuts.

Application of the heat flow of high intensity against a glassware with a design combined of gray cut and smooth glazed portions on the surface thereof is accompanied by deviations from the optimum operating conditions, which are as follows:

(1) overheating of some portions of the ware being polished, in which case, regardless of a low heat conductivity of glass, the ware is caused to be heated through the whole wall thickness thereof resulting in structural deformations in the ware and distortions of the design cuts;

(2) substantial melting of some of the elements of the design cuts, which results in that sharp edges of the design cuts subjected to high heat are caused to flow and distort the design pattern; and (3) insufficient polishing of some elements of the design, in which case the elements of the design cuts furtherst from the outer surface of the ware are not sufficiently exposed to the effect of the heat flow due to the formation of stagnation zones filled with combustion products and because of the volatile escape of various glass constituents therefrom.

An increase in the duration and intensity of heat application against the elements of the design cuts causes the above described averse consequences.

In a method of polishing by a thermal shock (cf. Czechoslovak Pat. Nos. 113,515, and 129,360) a glass article is subjected to a heat stream of high intensity and short duration essentially from all directions.

Along with fusion of the surface of the article being polished this causes heating of the whole structure thereof due to the effect of the infrared radiation passing therethrough, thereby resulting in structural deformations.

Further known from U.S. Pat. No. 2,566,350 is a method of flame polishing the ornamental design of a glassware, the cuts of the design being ground by fine abrasive, residing in that a burner flame is directed against the design cuts, the width of the flame being essentially equal to the width of the cuts. Whilst being polished, the glassware is caused to rotate and progressively moves through the flame.

In this method the flame is directed most of the time essentially tangentially relative to the design cuts. Therewith, the design elements of the cuts furtherst from the glazed surface of the glassware are not subjected to the direct effect of the flame, while the glazed surface which is adjacent to the cuts and which need not be polished is acted upon by the heat of high intensity. In the part of the design whereagainst the flame is directed perpendicularly, stagnation zones are formed containing the products of combustion thereby entailing incomplete polishing of the cut surfaces of the design.

An increase in the duration of the heat application against the design to impart more heat thereto causes the outer surface elements thereof to fuse and the whole structure of the ware being polished to deform because the walls of the ware are caused to be heated throughout the entire thickness thereof to a temperature essentially higher than the glass softening point. Disadvantages of this method become more pronounced if the glassware being polished is comprised of a combination of both small and large cuts ground on the surface thereof. Adding to the deformation of the glassware and fusion of the cut edges is the fact that the stream of heat, while travelling around the contour of the ware, tends to maintain an elevated temperature at the wall portion opposite to the one subjected to the stream of heat although without facilitating the polishing operation.

It is a major object of the invention to select a stream of heat of required shape and intensity to be directed against the surface of a glassware being polished.

Another object of the invention is to simplify the technology of glassware polishing and improve the quality thereof.

A further object of the invention is to improve the sanitary conditions for the operators and contribute to the preservation of the environment.

A still further object of the invention is to provide conditions for automating the process of glassware polishing.

To attain these and other objects in a method of heat polishing pattern cut glassware through the application of high heat against the surface thereof, according to the invention, the polishing is effected by a beam of concentrated heat flow moving sequentially along the entire surface area of the ware, the effective width of the heat flow being substantially less than the circumference of the ware being polished, each element of the cut pattern being exposed to equal heat stress.

Preferably, for heat polishing various glassware having dissimilar designs cut on the surface thereof, the selectable width of the concentrated heat flow ranges between 0.5 and 6.0 mm.

Preferably, each element of the cut pattern is subjected to a single-acting pass of the concentrated heat flow.

Glassware polishing according to the invention may be carried out through the application of at least two beams of the concentrated heat flow.

Disclosd hereinbelow is the essence of the present invention.

A flow of heat of sufficient intensity causes the surface of the glassware being polished as well as the pattern cut thereon to fuse to thereby smooth out the surface irregularities under the action of the surface tension forces.

When polishing glassware from lead containing glass the heat flow must contain no reducing gases, since under the action of the latter the lead oxide of the glass surface tends to reduce to metallic lead which leads to the appearance of dullness and consequently to defective end products.

In order to improve the efficiency of application of the gas flow against the pattern cut surface of the glassware being polished, the flow is preferably concentrated into a beam, the effective width of the beam being substantially less than the circumference of the glassware being polished.

The application of the burner gases as heat carriers acts to facilitate the heat transfer throughout the entire depth of the cut pattern in the course of heat polishing which ensures a uniform polishing all the pattern cut elements.

The use of alternative concentrated heat flows provides, accordingly, for a strictly limited portion on the generatrix of the ware to be heated.

Each given portion of the surface area of the glassware being polished is subjected to the concentrated heat flow only once, which prevents structural deformations to occur as a result of low heat conductivity of glass.

By virtue of the fact that only a limited portion of the glassware is affected by heat at any given time in the course of operation, a concentrated heat flow of substantially higher temperature can be applied, which affords to increase the efficiency of the whole process.

Gas burners, plasma generators, radiation heaters or any other suitable means can be used as the sources of high heat.

Conforming to the aforedesclosed operating conditions will result in a highly efficient method of heat polishing pattern cut glassware.

Figure 1:
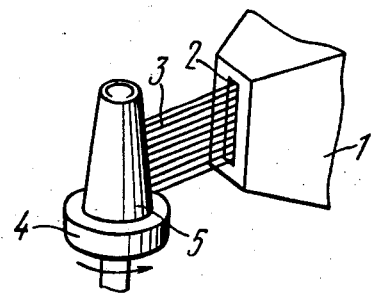

Other objects and advantages of the present invention will become apparent from the following detailed description of the embodiments thereof taken in conjunction with the accompanying drawings, in which:

FIG. 1 illustrates the general principle for carrying out a method of heat polishing glassware according to the invention; and FIGS. 2 and 3 are schematic representations of the effect of the heat flow on various elements of a cut pattern.

Referring now to FIG. 1, there is shown a means for heat polishing glassware embodying the principles and features of the present invention.

The means comprises a burner 1, a nozzle 2 producing a heat beam 3, and a turntable 4 with a glassware 5 fixed thereon.

FIGS. 2 and 3 show schematically, by way of illucidating the method according to the invention, the effect of the heat flow on the elements of the cut pattern.

Disclosed hereinbelow are specific examples for practising the method according to the invention.

EXAMPLE 1

A glassware from lead glass, such as a tumbler, having a design pattern cut at the surface thereof, the width of the ground elements of the design being essentially 3 mm, is heated in a conventional lehr or kiln to a temperature essentially below the softening point of glass, e.g. to 480° C. The ware being fixed to a turntable is then subjected to a flow of concentrated heat, the width of the flow being within from 1.0 to 2.5 mm, the temperature thereof amounting to 1580° C. While maintaining a preset rate of rotation, heat polishing is conducted by turning the ware by 360°–390°.

One gas burner is used as a source of the heat flow.

The heat flow covers the entire height of the ware along the generatrix thereof.

By heating a portion of the surface area of the ware which is substantially less than the total surface area thereof the concentrated heat flow acts to heat that portion to a temperature at which flowing begins.

The shape of the heat flow and duration of its application against a limited portion of the surface area of the ware are such that the wall structure or the rest of the ware is never heated throughout its entire thickness to the temperature attained at the surface area subjected to the heat flow, which prevents deformation of the ware and distortion of the cut pattern to occur.

Inasmuch as the heat flow is commensurable with the elements making up the cut pattern, each element of the cut pattern is subjected to a thermal stress of equal value. Shown schematically in FIGS. 2 and 3 is the effect of the heat flow on the elements of the cut pattern.

After sequential passing of the concentrated heat flow throughout the entire surface area of the patten cut glassware, a smooth, glazed surface free of deformations and distortions of the design is obtained, the definition of the pattern being preserved.

The thus polished ware is then conveyed into a conventional lehr or kiln to anneal or remove the strains therefrom.

EXAMPLE 2

A lead glass ware, such as a goblet, having a design patten ground at the outer surface thereof, the width of the cut pattern elements being essentially within the range of from 1.0 to 2.5 mm, is subjected to heat polishing conforming to the operating conditions described heretofore in Example 1, the width of the heat flow being between 0.5 and 1.5 mm. The stem and base of the ware are not subjected to the heat treatment.

EXAMPLE 3

A larger lead glass article, such as a flower or fruit vase, having a design at the surface thereof cut by grinding, the width of the design elements being within the range of from 4 to 12 mm, is heated in a conventional lehr or kiln to a temperature not in excess of the glass softening point, e.g., to 460° C. The ware being fixed on a turntable is then subjected to a concentrated heat flow, the width thereof ranging from 3 to 6 mm. Two or three gas burners serve as sources of the heat flow. When two burners are used, the ware is turned by 180°, whereas with three burners the ware is turned 120°. Heat polishing conditions must conform to those referred to in Example 1.

EXAMPLE 4

Lead or soda lime glass articles, such as formed commercial ware, not being ground but yet having design indentations within the range referred to in Examples 1 to 3, are subjected to heat polishing essentially conforming to the operating conditions disclosed in said examples. Heat polishing is carried out here to improve the surface quality as well as to increase the mechanical and thermal strength of the glassware.

Therefore, the method of heat polishing pattern cut glassware features, as compared with the prior art methods, substantial technological, economical and ecological advantages, among which are the following:

simplification of the technology of the process;
improvement in the quality of the end product;
saving on the material, energy and labor expenditures;
reduction of the cost of the equipment required;
improvement of the sanitary conditions for the operators and protection of the environment; and
creating potential conditions for automated processing.

What is claimed is:

1. A method of heat polishing pattern cut glassware by subjecting the surface thereof to high heat, wherein the heat polishing is carried out in a single acting pass by a beam of concentrated heat flow with sequential movement thereof along the entire surface of the glassware being heat polished, the selectable effective width of the concentrated heat flow being such as to heat only a small portion of the space pattern of the ware being processed over its entire height at a time, each element of the cut pattern being exposed to equal heat stress.

2. A method according to claim 1, wherein the width of the concentrated heat flow ranges from 0.5 to 6.0 mm.

3. A method according to claim 1, wherein heat polishing of glassware is carried out by at least two beams of the concentrated heat flow which are made to act on every element of the space pattern only once.

* * * * *